April 6, 1965  D. L. CLEMMONS, JR  3,176,933
THERMAL CONTROL OF SPACE VEHICLES
Filed May 3, 1963  2 Sheets-Sheet 1
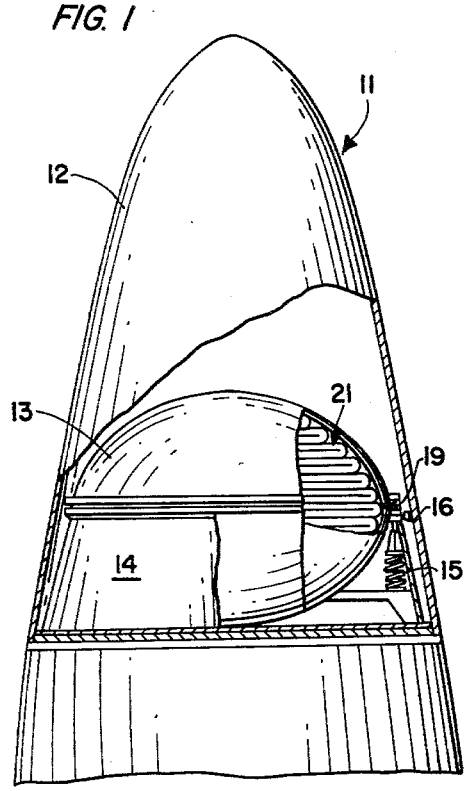
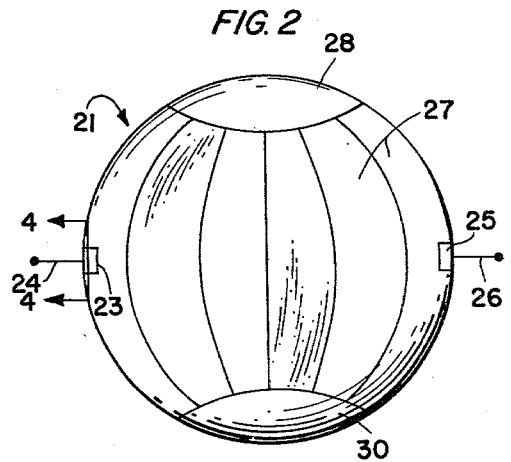
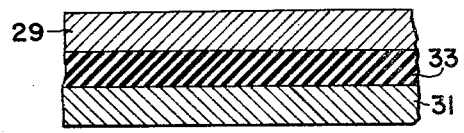
FIG. 3
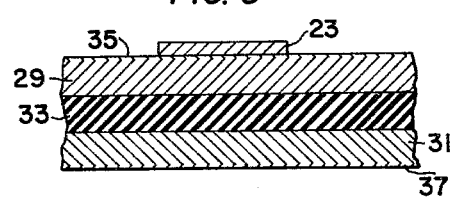
FIG. 4
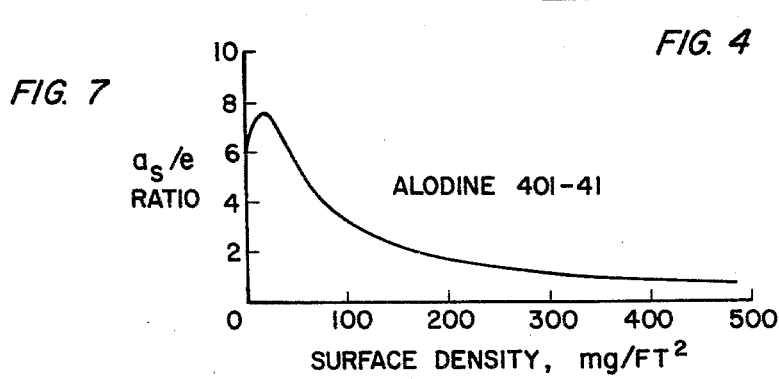
INVENTOR
DEWEY L. CLEMMONS, JR.
BY
ATTORNEYS United States Patent Office 3,176,933
Patented Apr. 6, 1965

3,176,933
THERMAL CONTROL OF SPACE VEHICLES
Dewey L. Clemmons, Jr., Hampton, Va., assignor to the United States of America as represented by the Administrator of the National Aeronautics and Space Administration
Filed May 3, 1963, Ser. No. 277,961
5 Claims. (Cl. 244—1)
(Granted under Title 35, U.S. Code (1952), sec. 266)

The invention described herein may be manufactured and used by or for the Government of the United States of America for governmental purposes without the payment of any royalties thereon or therefor.

This invention relates generally to the thermal control of space vehicles, and relates with particularity to a coating and method of applying same to an aluminum surface for use as the external surface area of space vehicles to passively control the temperature of the vehicles when exposed to a spatial environment.

Previous passive methods of controlling the surface temperature of spacecraft have included surface oxidation, vapor deposition of thin metallic films, and partially coating the surface area of the spacecraft with paint to attain the desired effective thermal radiation characteristics. The disadvantages of these prior art methods include the numerous problems included in maintaining the required delicate environment for adequate application thereof which makes the operation hard to control and limiting in its practicability to small spacecraft. The disadvantages of paints is that most of those presently available do not possess stable thermal radiation characteristics when exposed to the space environment and no known method of application of the paints has been achieved to produce the desired thermal radiation characteristics while minimizing the weight thereof. Further, no known method of paint application has been developed capable of obtaining a wide range of thermal radiation characteristics or for providing a complete coverage of the surface area to minimize thermal gradients.

The most significant parameter that can be varied to control the temperature of satellites and space vehicles is the ratio of the solar absorptance to the low-temperature emittance $(a_s/e)$ of the external vehicle surface area. The expression $a_s/e$ is the ratio of the absorptivity of the face of a plate to solar radiation $(a_s)$ to the emissivity of the face of the plate to thermal radiation $(e)$. Since these quantities are dependent only on the unit surface of an object, the temperature of the object can be adjusted to the desired value by selecting a coating for the object's face that has the requisite value of $a_s/e$. This is the routine procedure used in the design of spacecraft.

For example, the temperature of a hypothetical flat plate, so oriented that its front face points directly toward the sun and positioned in space at a distance from the sun equal to the earth's distance and having a back side coated with an insulating material so that the plate can neither gain nor lose heat energy through its back side, and considered of unit area, may be used to illustrate the significance of the solar absorption to emittance ratio of a body. The amount of solar radiation energy incident on the front face of this hypothetical plate in unit time is then the solar constant S whose dimensions are energy-per-unit-area-per-unit-time. A fraction of S is absorbed by the plate, the remained being reflected. The fraction that is absorbed is called the absorptivity of the plate to solar radiation $(a_s)$ and is dimensionless. Accordingly, the heat input to the plate per unit of time is $Sa_s$. The temperature of the plate will increase until it reaches a temperature such that the rate at which it radiates heat away as thermal radiation is equal to the rate that it is acquiring heat from solar radiation. The rate at which the plate radiates heat from its front face is given by the familiar formula $e\sigma T^4$, where $e$ is the emissivity of the plate to thermal radiation and is a dimensionless quantity whose numerical value can lie between 0 and 1, $\sigma$ is the Stefan-Boltzman constant, and T is the absolute temperature of the plate. Equating the rate at which the plate loses energy by radiation to its rate of acquisition of energy by absorption of sunlight gives:

$$e\sigma T^4 = Sa_s$$

This equation is solved for the temperature T of the plate to give:

$$T = \left(\frac{S}{\sigma} \frac{a}{e}\right)^{1/4}$$

The quantity $S/\sigma$ is a constant since it is composed of two constants and therefore cannot be altered as a means of controlling the temperature of the plate. The other quantity $a_s/e$ is the ratio of the absorptivity of the face of the plate to solar radiation $(a_s)$ to the emissivity of the face of the plate to thermal radiation $(e)$. Since these quantities are dependent only on the surface of the plate, the temperature of the plate can be controlled to the desired value by selecting a coating for the plate's face that has the requisite value of $a_s/e$. This is the principle used in the design of the spacecraft surface according to the present invention.

A space environment for simulating the effects of high vacuum, heat and ultraviolet radiation can be attained to a reliable degree in the laboratory for studying possible coatings utilizable for altering the $a_s/e$ ratio of the body.

The choice of available passive coatings to thermally control the surface area of spacecraft to a temperature within tolerable limits is restricted to a considerable extent by the inability of many available surface coatings to withstand the effects of the space environment. A large variety of materials and coatings have been investigated in order to develop coatings which will have stable thermal radiation characteristics in the space environment and include organic and inorganic paints, enamels, ceramics, stably oxidized metals, and vapor-deposited and electro-deposited metals. Some of these materials present problems in application thereof as coatings due to the controlled environmental conditions required during the coating process. Also, some of these materials create a weight problem when employed as surface coatings, which must be a major consideration in selecting the required thermal control coating for some space applications. For example, in the case of thin-walled passive communications satellites, such as that illustrated in U.S. Patent No. 2,996,212, where the mass-to-area ratio of the structure is quite small, the coating weight is of major importance.

In such cases, the coating weight can become an appreciable portion of the total satellite weight and an excess of which obviously limits the size capability of the satellite structure. The extremely large surface area of presently contemplated passive communications satellites make it highly desirable that the thermal control coating be applied to the base material in a mass production process before the material is cut into the proper shaped sections for vehicle construction. The general stability of inorganic type of coatings suggests that they are preferable to organic type of coatings since the latter generally tend to deteriorate more rapidly when subjected to the space environment with consequent changes in the thermal radiation characteristics of a satellite structure.

The long lifetime experienced by the now famous Echo I satellite, illustrated the practicality of inflatable structures for a passive communications system in the upper atmosphere and has led to the expectation of further satellites of considerably larger diameter to be built in the near future. One such satellite under consideration will be a 135-foot diameter passive communications sphere constructed of a three-layer laminate. The laminate of this proposed satellite will be composed of a 0.00035-inch thick Mylar film adhesively bonded between two layers of 0.00018-inch thick, 1080 aluminum foil. The aluminum foil has a low temperature, 0° to 100° C., emittance of 0.03 and an absorptance to solar radiation of 0.18, giving it an $a_s/e$ ratio of 6.0. It has been theoretically determined that if the aluminum surface characteristics could be altered such that an $a_s/e$ ratio of 1.67 could be obtained, the desired average surface temperature range of 45°–70° C. of the aluminized sphere would be maintained throughout the sunlit portion of the orbital flight of this satellite vehicle. Therefore, by selecting a coating material that has an $a_s/e$ value of 1.67, or a coating with an $a_s/e$ ratio less than 1.67 and applying this coating on the aluminum foil of such density that the resulting $a_s/e$ ratio will be 1.67, this desired temperature control can be obtained.

Accordingly, it is an object of the present invention to provide the use of a coating for the control of the $a_s/e$ value of an aluminum surface.

Another object of the present invention is the provision of a method of regulating the thermal balance of an aluminum surface.

A further object of the present invention is the provision of a method for controlling the maximum surface temperature of an aluminum surfaced space satellite when exposed to a part sunlit and part shadow orbital environment.

A still further object of the present invention is a method of providing a satisfactory thermal environment for temperature-sensitive radio telemetry beacons.

An additional object of the present invention is the provision of a chemically adherent amorphous coating for an aluminum surface space vehicle.

Yet another object of the present invention is a method of controlling the temperature parameter of an aluminum surface space vehicle within a spatial vacuum.

The foregoing and other objects are attainable in one application of the present invention by providing a thermal control coating for a space satellite constructed of a flexible, inflatable, material that can be folded into a small volume and placed on earth orbit prior to being erected into its final configuration. The extremely large surface area of such inflatable satellites makes it desirable that the thermal control coating therefor be applied to the base material in a mass production process before the material is cut into the proper shaped sections for balloon assembly. The material employed in practice of the present invention is a three-layer lamination comprising a flexible plastics center section with two layers of aluminum foil adhesively bonded to the opposite surfaces of the plastics layer. The aluminum foil exterior surfaces are then chemically coated with an adherent amorphous metallic phosphate coating to provide the desired absorptance-emittance ratio characteristics thereto. The chemical solution employed to produce this chemical adherent coating is a mixture of chromic, phosphorous and hydrofluauoric acids in the desired proportions to give the desired chemical reaction in relation to immersion time.

Since the described laminate is fabricated in strips about 54 inches wide and a few hundred yards long and can be supplied in rolls, it lends itself very well to the immersion process where it can be pulled through a vat of the solution with the immersion time therein being readily controlled by the speed of the takeup roller. The enormous size of the contemplated sphere, approximately 135 feet in diameter or approximately 57,000 sq. ft. of surface area, renders any other type of coating process almost impractical.

As mentioned hereinbefore, it has been theoretically determined than an $a_s/e$ ratio of 1.67 would be necessary to provide a thermal balance for an aluminum surface in the range of 45°–70° C. when subjected to a continuous sunlight environment. Accordingly, by selecting the specific composition of the acid mixture and controlling the immersion time of the base lamination, it is possible to control the thickness or surface density of the amorphous phosphate film which is chemically produced onto the aluminum foil layers. This coating process is referred to in one commercial application as "Alodizing" and the solutions used for the chemical conversion of the aluminum surface are available as Alodine from the AMchem Products Company. Alodine is available in essentially any desired ratio of acid mixtures and the mixture employed in the present invention is such that the resulting coating is believed to contain approximately 50 to 55 percent chromium phosphate, $CrPO_4$, 17 to 23 percent aluminum phosphate $AlPo_4$, 22 to 33 percent water, as well as traces of the fluorides of aluminum, chromium, and calcium with the water being wholly or partially removable by heat. This coating has the chemical property characteristic of being insoluble in water, alcohols, dilute acids and dilute alkalies, while being soluble in molten sodium nitrate and concentrated nitric acids solution. A more complete analysis of Alodine and its property characteristics appears in the 36th annual Proceedings of the American Electroplaters' Society entitled "Amorphous Phosphate Coatings for Protection of Aluminum Alloys and for Paint Adhesion" by Alfred Douty and F. P. Spruance, Jr.

The inflation medium proposed for the presently described satellite structure is the sublimating solid acetamide, which requires a minimum temperature of about 45° C. for desired performance in this particular satellite application. In addition, radio telemetry beacons attached to the exterior surface of this satellite will not perform reliably above about 70° C. Thus, it is of particular importance to provide a coating for the satellite structure which will insure a continuous sunlight thermal balance in the range of 45° to 70° C. for adequate operation. In space and when exposed to continuous sunlight the noncoated lamination, consisting of 0.00018-inch thick 1080 aluminum foil on both sides of a film of 0.00035-inch thick Mylar, would have an absorptance to emittance ratio of 6.0 and would heat to approximately 150° C. which, obviously, is too hot for the operation of the radio beacons planned for use on the surface of the satellite.

A more complete appreciation of the invention and many of the attendant advantages thereof will be readily apparent as the same becomes better understood by reference to the following more detailed description when considered in connection with the accompanying drawings wherein:

FIG. 1 is a side elevational view of a carrier vehicle payload nose cone, with parts broken away to show packaged therein a canister housing a space satellite employing the coating of the present invention;

FIG. 2 is a perspective view of the inflated space satellite after being released from the canister;

FIG. 3 is an enlarged sectional view of a lamination employed to construct the satellite shown in FIG. 2 prior to having the coating applied thereon;

FIG. 4 is an enlarged sectional view of the material employed to construct the satellite taken along lines 4—4 of FIG. 2 and illustrating the adherent thermal control coating on the laminated structure;

Figure 5:
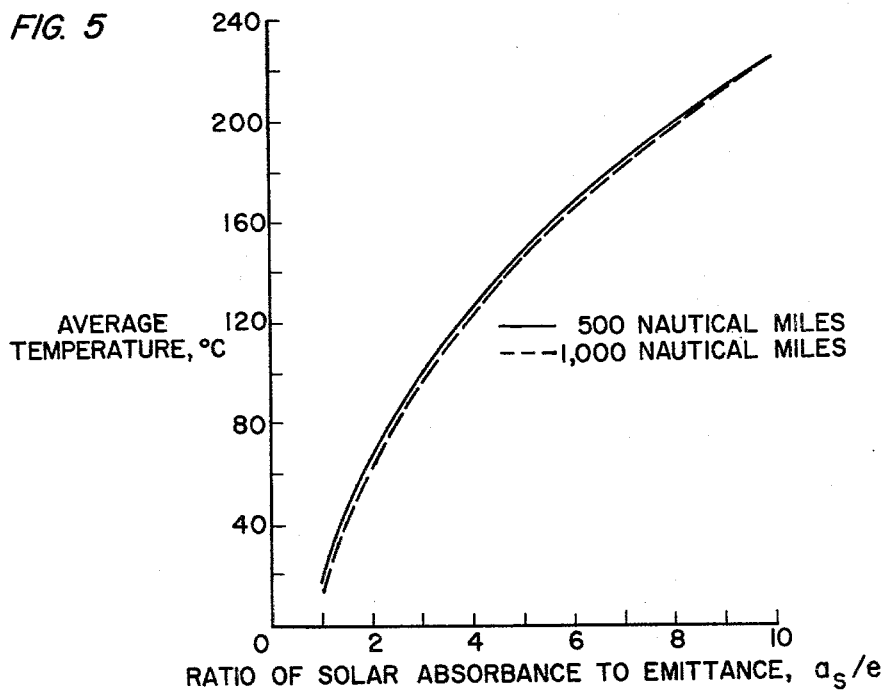
FIG. 5 is a graphic representation of average temperature versus $a_s/e$ ratio that would be anticipated for a space satellite of this type.

Referring now more parctiularly to the drawings, wherein like reference numerals designate identical or corresponding parts throughout the several views, and more particularly to FIG. 1, there is shown a rocket vehicle 11 having a detachable nose cone 12 positioned thereon about an oblate spheroid canister 13. Canister 13 is detachably secured to an adapter 14 which in turn is secured to vehicle 11 in a conventional manner. Vehicle 11 is propelled into the upper atmosphere by a suitable rocket charge, not shown, where at some predetermined height nose cone 12, having served its function of protecting payload canister 13 during passage through the earth's atmosphere, is separated from vehicle 11 in a conventional manner to expose the payload.

After a predetermined time interval suitable mechanism, such for example explosive bolts, not shown, effects the release of a conventional Marman clamping band 16 maintaining canister 13 within adapter 14. A plurality of ejection springs, one of which is shown in FIG. 1 and designated by reference numeral 15, then forcibly eject canister 13 from its seat within adapter 14 such that a safe distance between rocket vehicle 11 and canister 13 may be obtained before the large folded satellite 21 is released for inflation.

A predetermined period of time after canister 13 separates from adapter 14, conventional mechanism, such for example an outwardly directed annular hollow charge 19 positioned between the mating surfaces of the canister halves, is actuated to separate the canister and expose inflatable satellite structure 21 to the spatial environment. Explosive charge 19 may be actuated by any conventional timing device connected thereto, and not shown, after the ejection of canister 13 from adapter 14. Satellite 21 is in an initially folded position within canister 13 and contains therein a predetermined quantity of the temperature responsive sublimating solid inflation compound for effecting spatial erection thereof.

Upon being separated from canister 13, satellite structure 21 is heated by radiation from the sun; the vapor pressure of the enclosed subliming solid increasing to inflate structure 21 to its predetermined configuration. The quantity of subliming compound employed is such that the structure 21 will be inflated sufficiently to develop a permanent set within the laminated structure thereof; that is, the structure will be stressed just beyond its yield point, but far short of the tensile strength thereof to assume a rigid inflated configuration. The halves of canister 13, which are of heavy metal construction, after separation from the inflatable structure 21 also remain in orbital flight and become space debris.

A pair of radio telemetry beacons 23 and 25 are attached to the exterior surface of satellite 21 at diametrically opposed positions to relay information back to earth stations. Suitable conventional erectable antennas 24 and 26 are provided for beacons 23 and 25 respectively. The telemetry beacons, presently available, will not perform reliably at temperatures greater than about 70° C. and accordingly, it is necessary to maintain the average surface temperature of structure 21 below this temperature level to achieve maximum utility from the satellite. It is for this and other reasons that it is necessary to provide a thermal balance coating for the surface of satellite 21.

Referring now more particularly to FIGS. 3 and 4, the individual gores 27 of satellite structure 21 are constructed of a lamination of 0.00018-inch thick 1080 aluminum foil 29 and 31 on both sides of a 0.00035-inch thick flexible plastics film 33 such for example Mylar, with the aluminum foil laminations 29 and 31 being bonded to the plastics 33 by a conventional thermosetting adhesive, such for example GT-301 adhesive available from the G. T. Schjeldahl Company.

The individual gores 27 are adhesively bonded together and to a pair of end caps 28 and 30 in butt-joint fashion with individual overlying splice tapes, not designated. End caps 28 and 30 and the individual splice tapes are also constructed of the hereinbefore described laminate material with a coating of amorphous metallic phosphate being applied to the individual aluminum surfaces of all the parts prior to assembly of structure 21, as will be further explained hereinafter. Obviously in a structure of the size anticipated for satellite 21, the coating process for the individual gores requires a mass-production type of operation due to the enormous surface area to be coated, and the immersion process described hereinafter proves to be quite practical for applying the desired coating to the entire surface of the satellite structure components.

*Coating process*

After preparation of the lamination as described hereinbefore, in the desired length and width dimensions, the laminant material is stored on conventional spools or rollers. The laminate is then available for a continuous mass-production type coating process wherein it can be passed through a cleaning solution to remove grease and other surface contaminates, rinsed to remove the cleaning solution and passed through a vat of coating solution prior to being washed, dried, and taken up by a take up roller.

Any conventional cleansing solution may be employed for the cleaning operation; for example, it is possible in small operations to remove the grease and other contaminants by scrubbing the laminate in a soap and water solution. However, for the mass production operation contemplated herein, a vat of a suitable inhibited alkali, such for example Ridoline, may be employed with the laminate passing through the vat over conventional rollers to effect removal of the contaminants. After leaving the cleaning vat the laminate is washed with water, either by a spray directed against both sides thereof or in any other conventional manner, to remove the cleaning solution therefrom prior to entering a vat of the coating solution. The exposure time for the laminate in the cleaning and coating solution is readily controlled in a conventional manner, such as controlling the speed of the take up roller, as well as the positioning of individual rollers along the path of the continuously moving laminate material being coated. After leaving the vat of coating solution the laminate is again washed to remove excess coating solution and dried by radiation prior to being received on the take up spool or roller. A solution of Alodine 401-41, or any other desired Alodine or similar acid solution which will react with the aluminum surface to chemically react with a thickness of the aluminum and thereby produce the desired chemically adherent metallic phosphate coating thereon may be employed for the coating or acid bath solution.

Figure 6:
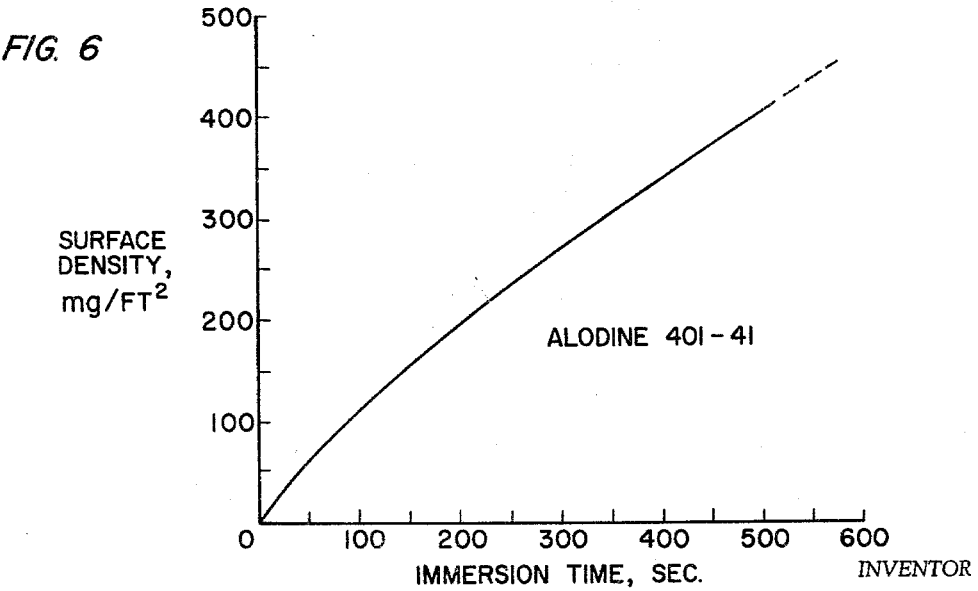
FIG. 6 is a graphic representation of the coating weights obtained per unit area in proportion to immersion time in seconds when employing one specific chemical solution and temperature according to the present invention; and, FIG. 7 is a graphic representation of the $a_s/e$ ratio to surface density for a particular coating solution.

The immersion time and the temperature for the acid bath through which the laminate is passed will vary according to the required surface density coating for the particular operation and according to the specific solution employed. For example, as shown in FIG. 6 an immersion time of 300 seconds in an Alodine 401-41 solution will produce a coating having a surface density of approximately 260 milligrams per square foot area. This amount of coating is applied simultaneously to both sides of the laminate, as illustrated in FIG. 4 and designated by reference numerals 35 and 37. The temperature of the Alodine bath employed to obtain the results plotted in FIG. 6, was maintained at 110° F. ±.5° F., although it is obvious that this could be varied with different solutions and for different immersion times. Generally speaking, the weight of the coating, within limits, will vary directly with the immersion time at a given bath temperature and concentration. After coating, the laminate may be unwound to the desired length and the individual gores 27, tapes, and end caps 28 and 30 being cut therefrom in the desired fashion to fabricate satellite structure 21 as described hereinbefore.

Since the surface density of the adherent phosphate coating 35 and 37 formed on the aluminum foil has been shown to directly control the spectral absorptance-low temperature emittance ratio, the total coated weight-per-unit area is the controlling factor for determining the thermal balance of an aluminum surface body fabricated in accordance with this invention.

As shown in FIG. 5, to obtain a control thermal balance temperature in the range of 45° C. to 70° C. the ratio of solar absorptance to emittance should be approximately 1.67. By employing a coating that has an $a_s/e$ value less than 1.67 in such thickness or density on the aluminum foil that the resulting $a_s/e$ will be approximately 1.67 has proved a desirable approach for controlling the thermal balance of aluminum structures, as in this invention. It may also be possible to acquire a coating that has an $a_s/e$ ratio of exactly 1.67 and deposit it on the aluminum foil substrate, or to select a coating that has a much lower $a_s/e$ value than 1.67 and partially coat the aluminum surface, for example in a dot pattern to such an extent that the effective $a_s/e$ ratio of 1.67 is obtained; however, the approach taken herein appears the best suited for mass production coating processes.

As shown in FIG. 7, the $a_s/e$ ratio for Alodine 401–41 increases at first, reaching a value of about 7.5 at 20 mg./ft.$^2$, but then decreases, rapidly at first, tending to become constant at about 0.82 for coating densities above 425 mg./ft.$^2$.

A further correlation of the immersion time in relation to surface density of the coating obtained and the correlation thereof to the $a_s/e$ ratio is best illustrated in the following table:

| Coating | Immersion Time (Sec.) | Surface Density, mg./ft.$^2$ | Temp., Deg. C. | e | $a_s$ | $a_s/e$ |
|---|---|---|---|---|---|---|
| Alodine 401–41 | 15 | 30.4 | −2<br>48<br>94<br>2.7 | .0410<br>.0465<br>.0460<br>.0520 | .331 | 7.12 |
| | 30 | 40.0 | 57<br>97<br>0 | .059<br>.059<br>.071 | .357 | 7.05 |
| | 60 | 83.2 | 44<br>96<br>2 | .082<br>.087<br>.148 | .343 | 4.18 |
| | 120 | 141.2 | 47<br>95<br>−2 | .158<br>.156<br>.159 | .349 | 2.21 |
| | 180 | 184 | 54<br>96<br>−1 | .180<br>.181<br>.202 | .355 | 1.86 |
| | 240 | 300 | 50<br>92<br>−2 | .262<br>.252<br>.506 | .347 | 1.32 |
| | 540 | 426 | 50<br>93 | .506<br>.505 | .414 | 0.82 |

Thus, as shown in this table and also as illustrated in FIG. 5, the equilibrium temperature of a spherical satellite, with no internal heat generated, can be controlled while in the sunlight over a range varying from about 15° C. with an $a_s/e$ value less than 1.0, to about 190° C. with an $a_s/e$ value of 7.5. Therefore, by depositing the proper coating densities on the satellite any equilibrium temperature in the interval 15° C. to 190° C. can be obtained with Alodine 401–41 based on the experimental evidence obtained. Also, as shown in the above table the ratio of the solar absorptance to low-temperature emittance, $a_s/e$, of 1080 aluminum foil coated with Alodine 401–41 was found to vary from 7.12 to 0.82 as the surface density varied from 30.4 mg./ft.$^2$ to 426 milligrams per square foot. Since the most significant parameter than can be varied to control the temperature of satellites and space vehicles when subjected to a space environment is the ratio of the solar absorptance to the low-temperature emittance of the external surface, it is readily seen that by employing the teachings of the present invention that this parameter can be adjusted to that desired for a particular application.

Determination of coating weights

The density of the coatings as applied herein was determined in terms of milligrams per square foot in the following manner. A sample of the coated laminate was cut from a roll and, after drying the sample in a conventional desiccator, weighed to the nearest 100th of a milligram on a gravimetric balance. The sample was then immersed in a nitric acid solution to strip the coating from the aluminum surface. Concentrated nitric acid of 35 to 70 percent is sufficient to effect removal of the coating described herein if undertaken immediately after completion of the coating process before the coating is completely dried. The sample was then washed in distilled water to remove all traces of the acid, excess water removed by blotter paper with final drying in a desiccator for approximately ten minutes. The sample was then reweighed with the weight of the coating in terms of milligrams per square foot being calculated in a conventional manner.

It is thus seen that an inorganic coating can be chemically formed on an aluminum substrate to permit varying the thermal radiation characteristics from that of the substrate to that of the thermally opaque coating over a considerable range such that a wide variation of temperatures may be obtained for a satellite in the space environment. By use of this hereinbefore described process these desired characteristics can be attained with the addition of a minimum amount of weight. Also, as described hereinbefore, the coating thickness may be controlled within a very narrow limit using coating weights alone to determine thickness.

Obviously, this method can be used for altering the thermal radiation characteristics of any aluminum surface thereby affecting its temperature balance to a greater or lesser degree dependent upon the environment to which it is exposed. It can also be used to control the temperature of atmosphere balloons, to coat the aluminum surfaces of lunar buildings for the purpose of helping to maintain temperatures within tolerable limits for human existence during the lunar day and in many other applications where heat transfer by radiation is a major temperature controlling parameter.

An important feature of this invention is the control of the solar absorption/emittance ratio of the external surface area of a space vehicle. However, it is also within the scope of the present invention to employ other types of inorganic coatings to aluminum substrate surfaces for controlling the absorption/emittance ratio characteristic thereof.

Obviously, many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. A method of passively controlling the temperature of a satellite when orbited in a sunlighted spatial vacuum comprising:
   providing an exterior aluminum surface for said satellite,
   chemically converting a thickness of said aluminum surface into an amorphous phosphate layer,
   said amorphous phosphate layer having the physical property characteristic of providing a solar absorptance to emittance ratio range of 7 to 0.80.

2. A method of controlling the temperature of a particular inflatable satellite having an exterior surface of 1080 aluminum foil within the range of 45–70° C. when exposed to solar radiation in a spatial vacuum, comprising:
   chemically converting a thickness of a said aluminum exterior surface to an amorphous metallic phosphate coating, said coating having a surface density of approximately 200 mg./ft.$^2$.

3. In an inflatable structure constructed of an aluminum-flexible plastics-aluminum laminate and adapted to be placed in a spatial environment, the improvement therewith comprising:
   an adherent amorphous phosphate coating on the aluminum surface of said structure,
   said coating being formed as a reaction product of said aluminum surface and having physical property characteristic of controlling the solar adsorptivity-emissivity of the structure within predetermined limits.

4. In an inflatable satellite structure having an aluminum exterior surface and adapted to be placed in a spatial environment, the improvement therewith comprising:
- a thin low density adherent amorphous phosphate coating formed as a reaction product of said aluminum surface,
- said coating serving to control the temperature of said structure within predetermined limits.

5. In combination, an inflatable structure adapted to be inflated by sublimating solids when exposed to spatial vacuum conditions and radio telemetry becons on the exterior surface thereof, said beacons having the physical property of having unreliable operating characteristics at a temperature exceeding 70° C., the improvement therewith comprising:
- means for maintaining the temperature of said structure within the desired temperature range,
- said means including a flexible wall for said structure,
- said wall being provided with an aluminum exterior surface,
- an adherent coating of an amorphous metallic phosphate on said aluminum surface,
- said amorphous metallic phosphate coating being formed as a reaction product of said aluminum exterior and having the physical property characteristic of controlling the $a_s/e$ ratio of the surface to approximately 1.67.

References Cited by the Examiner

UNITED STATES PATENTS

| | | | |
|---|---|---|---|
| 2,438,877 | 3/48 | Spruance | 148—6.16 |
| 2,996,212 | 8/61 | O'Sullivan | 244—1 |
| 3,014,822 | 12/61 | Lauderman | 148—6.15 |

OTHER REFERENCES

Douty et al.: 36th Annual Proceedings, Technical Sections, American Electroplaters Society, 1949, pages 193–216, TS670A32.

FERGUS S. MIDDLETON, *Primary Examiner.*

R. DAVID BLAKESLEE, *Examiner.*